(12) United States Patent
Molaro et al.

(10) Patent No.: US 7,853,822 B2
(45) Date of Patent: Dec. 14, 2010

(54) TECHNIQUES FOR ENHANCING THE FUNCTIONALITY OF FILE SYSTEMS

(75) Inventors: Donald Joseph Molaro, Cupertino, CA (US); Jorge Campello De Souza, Cupertino, CA (US); Richard M. H. New, San Jose, CA (US); Chunqi Han, San Jose, CA (US); Damien C. D. Le Moal, Sagamihara (JP)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 467 days.

(21) Appl. No.: 11/566,978

(22) Filed: Dec. 5, 2006

(65) Prior Publication Data
US 2008/0133448 A1 Jun. 5, 2008

(51) Int. Cl.
G06F 11/00 (2006.01)
(52) U.S. Cl. ........... 714/6; 714/5; 714/42; 707/999.001
(58) Field of Classification Search ........... 714/5, 714/6, 42; 707/1, 2, 9, 104.1, 999.001, 999.099, 707/999.104, 999.107
See application file for complete search history.

(56) References Cited

U.S. PATENT DOCUMENTS

| | | | | |
|---|---|---|---|---|
| 4,993,030 | A * | 2/1991 | Krakauer et al. | 714/6 |
| 6,606,629 | B1 | 8/2003 | DeKoning et al. | |
| 6,870,887 | B2 | 3/2005 | Kauffman et al. | |
| 7,454,406 | B2 * | 11/2008 | Kaplan et al. | 707/2 |
| 2003/0193994 | A1 * | 10/2003 | Stickler | 375/150 |
| 2004/0059754 | A1 * | 3/2004 | Barghout et al. | 707/104.1 |
| 2004/0139027 | A1 | 7/2004 | Molaro | |
| 2004/0215643 | A1 * | 10/2004 | Brechner et al. | 707/100 |
| 2005/0071537 | A1 | 3/2005 | New et al. | |
| 2005/0071856 | A1 * | 3/2005 | Kumar et al. | 719/330 |
| 2005/0086567 | A1 | 4/2005 | Cronch | |
| 2005/0234847 | A1 | 10/2005 | Damien et al. | |
| 2006/0129909 | A1 * | 6/2006 | Butt et al. | 715/500.1 |
| 2007/0088674 | A1 * | 4/2007 | Kawate et al. | 707/2 |
| 2007/0113120 | A1 * | 5/2007 | Dodge | 714/703 |

(Continued)

OTHER PUBLICATIONS

"Application Programming Interface—Wikipedia, The Free Encyclopedia," http://en.wikipedia.org/wiki/Application_programming_interface, Sep. 13, 2006, pp. 1-3.

(Continued)

*Primary Examiner*—Robert Beausoilel
*Assistant Examiner*—Joseph D Manoskey
(74) *Attorney, Agent, or Firm*—Steven J. Cahill

(57) ABSTRACT

Enhancements to the functionality of a file system are provided. A file system can provide an additional level of error correction, in addition to the error correction provided by a data storage device. An extension to the metadata area in a file system can store index information about data files that the file system can use to reduce the time it takes to access the files. A file system can use extended metadata to store conditional access information for data files stored in the file system. A data storage device can also examine and characterize the data being stored in order to categorize a user's files automatically. Modules can be loaded into a file system to provide new functionality to the file system. The modules can load additional modules to extend their functionality.

19 Claims, 9 Drawing Sheets

U.S. PATENT DOCUMENTS

2008/0033921 A1* 2/2008 Arrouye et al. ................. 707/3
2008/0114805 A1* 5/2008 Nord ....................... 707/104.1
2008/0124052 A1* 5/2008 Sardera ..................... 386/124

OTHER PUBLICATIONS

Xiangming Mu, et al., "Enriched Video Semantic Metadata: Authorization, Integration, and Presentation," pp. 1-8.

"Digital Rights Management—Wikipedia, the free encyclopedia," http://en.wikipedia.org/wiki/Digital_Rights_Management, Sep. 13, 2006, pp. 1-11.

"Pattern recognition—Wikipedia, the free encyclopedia," http://en.wikipedia.org/wiki/Pattern_recognition, Sep. 13, 2006, pp. 1-2.

"Metadata—Wikipedia, the free encyclopedia," http://en.wikipedia.org/wiki/Metadata, Sep. 13, 2006, pp. 1-10.

* cited by examiner

TECHNIQUES FOR ENHANCING THE FUNCTIONALITY OF FILE SYSTEMS

BACKGROUND OF THE INVENTION

The present invention relates to file systems, and more particularly, to enhancements to the functionality of file systems.

A hard disk drive may occasionally fail to provide accurate data to a user or application as a result of data block corruption. Without a reliable backup of the data, or the implementation of a Redundant Array of Inexpensive Disks (RAID) level that provides fault tolerance, data can be irretrievably lost. Therefore, it would be desirable to provide a system that can handle data block corruption more robustly.

A file system is a technique for storing and organizing computer files to facilitate the process of locating the files. File system software can be used to manage data blocks that are stored on a data storage device, such as a hard disk drive. The file system organizes the data blocks into files and directories. The file system also keeps track of which data blocks belong to which file and which data blocks are not being used.

The file systems employed in computer systems are logical structures defined by monolithic, single modules of code. The operating parameters of the file systems, such as block size or the use of journaling, are fixed at compile time and cannot be changed without accessing the source code of the specific file system module. Also, the operating parameters are typically not optimized for the data being stored or the storage system's usage patterns.

The application-programming interface (API) that a hard disk drive provides to an operating system (OS) defines a standard set of functions used to access the hard disk drive. The API is not extensible and is independent of the file systems that is utilized on the hard disk drive. Therefore, it would be desirable to have a file system that allows for greater flexibility at run-time.

BRIEF SUMMARY OF THE INVENTION

The present invention provides techniques for enhancing the functionality of file systems. According to some embodiments of the present invention, the reliability of data is enhanced by providing additional error correction at the file system level. When a data storage device returns recovered data that contains errors, error correction provided by the file system can correct errors in the recovered data to improve the fault tolerance of the system. According to an additional embodiment of the present invention, a file system uses index data stored in an extended metadata area of the file system to access media files with an extended interface. The index data contains seek information that the file system uses to access the media files faster and more efficiently. According to an additional embodiment of the present invention, a file system uses extended metadata to store conditional access information for data files stored in the file system.

According to additional embodiments of the present invention, a file system examines a set of files and automatically categorizes the files based on their content. The file system creates index metadata used to build a view that allows a user to examine the content of the files. According to further embodiments, modules are dynamically loaded into a file system to add new functionality to the file system. The modules can load additional modules to extend their functionality.

Other objects, features, and advantages of the present invention will become apparent upon consideration of the following detailed description and the accompanying drawings.

DETAILED DESCRIPTION OF THE INVENTION

In general, hard disk drives (also referred to herein as hard drives) are logically formatted into one or more partitions that contain one or more logical file systems. The primary responsibility of a file system is to maintain the physical location of data on a storage device, such as a magnetic hard drive or an optical drive. The physical location of the data can be maintained by the metadata within the file system. Occasionally, a hard drive can experience data block corruption, resulting in data loss. Therefore, it would be desirable to provide a system that has the ability to recover from data block corruption errors using error correcting techniques at the file system level.

Figure 1A:
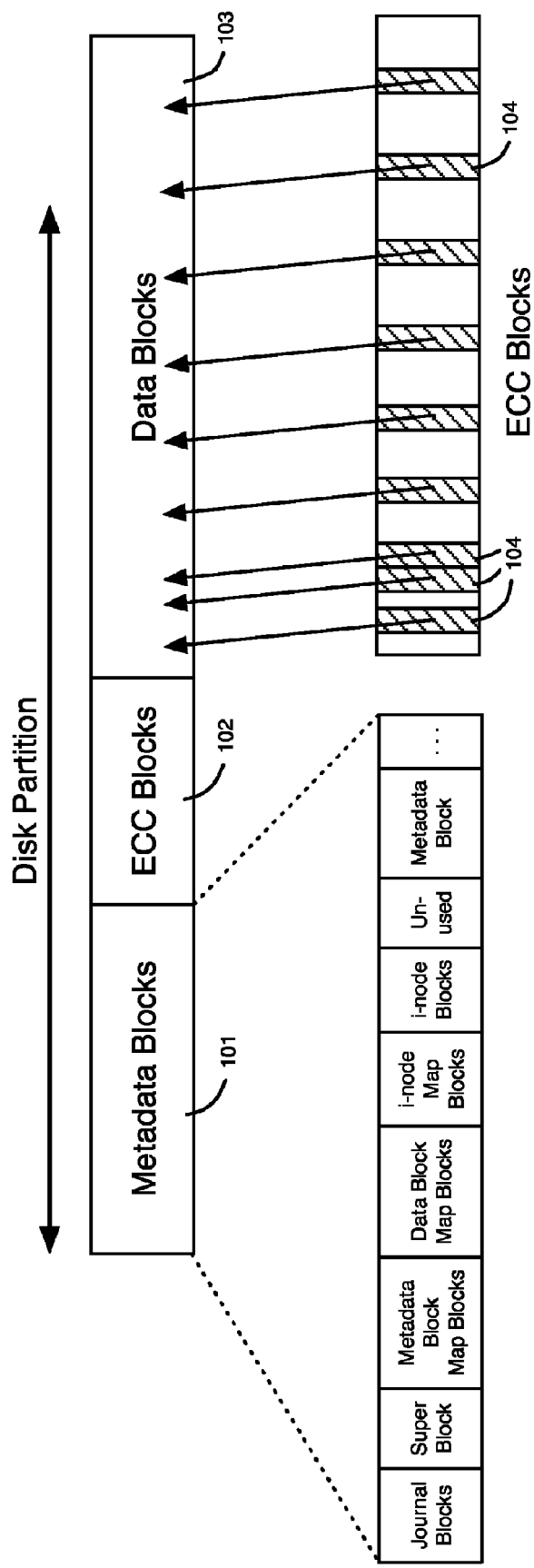
FIG. 1A is a block diagram that illustrates a partition on a hard disk drive for a file system that contains ECC blocks used to provide an extra level of error correcting capability at the file system level, according to an embodiment of the present invention.

According to some embodiments of the present invention, the fault tolerance of a hard drive or other storage device can be improved by performing error correction in the file system. FIG. 1A illustrates an example of a hard drive partition containing additional error correction capability that is performed at the file system level, according to a particular embodiment of the present invention.

The hard drive partition shown in FIG. 1A includes metadata blocks 101, an area to contain ECC blocks 102, and data blocks 103. ECC blocks 104 are an expanded representation of the ECC blocks 102 to show the detail of a potential mapping of the ECC blocks 102 to the data blocks. Metadata blocks 101 maintain information about the underlying file system, such as a directory catalog, which blocks are allocated to a file, and which blocks are unallocated.

When data is read from a storage device such as a hard drive, the storage device detects and corrects errors in data blocks using its own error detection and correction scheme. After the storage device has performed error correction routines on data blocks, the corrected data is transmitted to the host operating system that requested the data. Although the storage device provides a degree of error correction capability, the storage device cannot correct all possible errors that might occur in data blocks.

When under certain circumstances data blocks are corrupted, the storage device sends whatever data it can recover back to the requesting host operating system rather than returning no data. The storage device also sends information to the host operating systems that indicates which data blocks are likely to have been corrupted and could not be corrected by the storage device. The file system then performs additional error correction on the recovered data that the storage device indicates is corrupted. The file system is typically managed by a host operating system.

ECC blocks 102 are generated by a file system. ECC blocks 102 can be stored in an extended part of the metadata area of the file system. The file system generates additional error correcting code (ECC) bytes and cyclic redundancy check (CRC) bytes and stores these bytes in ECC blocks 102 to provide an additional level of error correction capability for data blocks 103 and/or metadata blocks 101, according to an embodiment of the present invention. The ECC blocks 104 show the detail of a potential mapping of the ECC blocks 102 to data blocks 103.

An allocation bitmap in the metadata blocks 101 indicates what data blocks are in use. The file system can generate a relationship between the data blocks 103 stored on the disk and the ECC blocks 102. The file system can use this relationship to determine which of the ECC blocks 102 are in use. Thus, the file system metadata effectively manages both the data blocks 103 and the ECC blocks 102.

The ECC blocks 102 can be any size to provide a desired level of error correcting strength. For example, each of the ECC blocks 102 can have more bits to increase the robustness of the error correction algorithm so that it can correct more of the errors that may be encountered.

After a host operating system receives data from a storage device, the file system determines if the data is correct, based upon the error return code from the command sent to the disk drive or by examining the data and checking to see if the ECC or CRC bytes match the returned data. If the data is not correct, the file system performs error correcting algorithms on data blocks 103 using the ECC and CRC bytes in ECC blocks 102. Data blocks 103 can have any arbitrary size. ECC blocks 102 provide additional error correcting capability at the file system level for correcting errors in the data that were not corrected by the storage device.

Figure 1B:
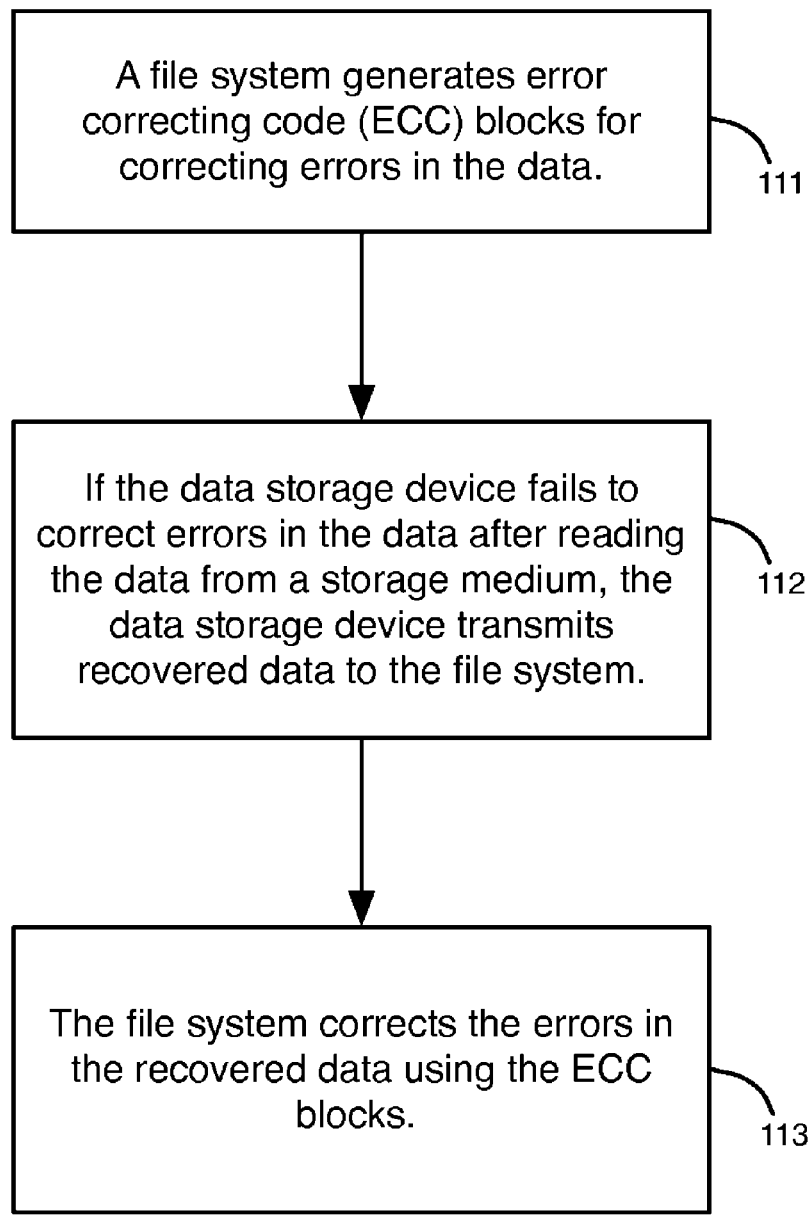
FIG. 1B is a flow chart that illustrates a process for correcting errors in data read from a storage device at the file system level using blocks of error correcting code, according to an embodiment of the present invention.

FIG. 1B illustrates a process for correcting errors in data read from a storage device at the file system level using ECC blocks, according to an embodiment of the present invention. The additional error correcting capability provided by the file system is typically managed by a host operating system. At step 111, a file system uses a error correction encoder to generate ECC/CRC bytes for correcting errors in data blocks 103 and/or in metadata blocks 101.

The ECC/CRC bytes are stored in ECC blocks 102 in a metadata area of the file system that has been allocated for that use. Alternatively, the additional ECC blocks 102 may be stored elsewhere in the data storage system. For example, ECC blocks 102 can be stored in a Flash memory on the electronics card of the hard disk drive. ECC blocks 102 can be stored any place in the system that has non-volatile memory, e.g., in storage in a hidden file system metadata area, in a section of Flash memory, in a reserved area on the hard disk drive, or even on an external device such as a flash card or other hard disk drive. The ECC and CRC bytes stored in ECC blocks 102 can be calculated using any suitable error correction encoder, such as a Reed-Solomon encoder.

If the data storage device fails to correct errors in the data after reading the data from a storage medium, the data storage device transmits recovered data to the file system at step 112. At step 113, an error correction decoder in the file system uses the ECC and CRC bytes in blocks 102 to detect and correct errors in the recovered data (e.g., data blocks 103 and/or in metadata blocks 101) to provide enhanced data reliability and to improve the fault tolerance of the storage device. The additional error correcting capability provided by ECC blocks 102 may recover data at the file system level that cannot be recovered by the storage device as a result of data block corruption.

According to further embodiments of the present invention, a file system that provides the additional error correction capabilities can be managed from the hard disk drive or other storage device. A host operating system can be run as a task on a disk drive operating system, as described in commonly-assigned U.S. patent application Ser. No. 11/552,888, filed Oct. 25, 2006, which is incorporated by reference herein. The host operating system can mount a file system that runs an encoder and a decoder for correcting errors using ECC blocks 102. As another example, a disk drive operating system on a disk drive controller can mount a file system, and use the ECC blocks 102 in the metadata area of the file system to perform an additional level of error correction on data blocks 103.

The error correction techniques of the present invention can apply to any system or software that uses a data block allocation scheme. A system or software application can utilize the present invention such that the benefits of high data integrity can be realized without effort by the application programmer or systems engineer. For example, systems or applications that utilize a raw partition of a hard disk can transparently provide this benefit from the error correction techniques of the present invention in addition to any error correction provided by a hard disk drive.

Figure 2A:
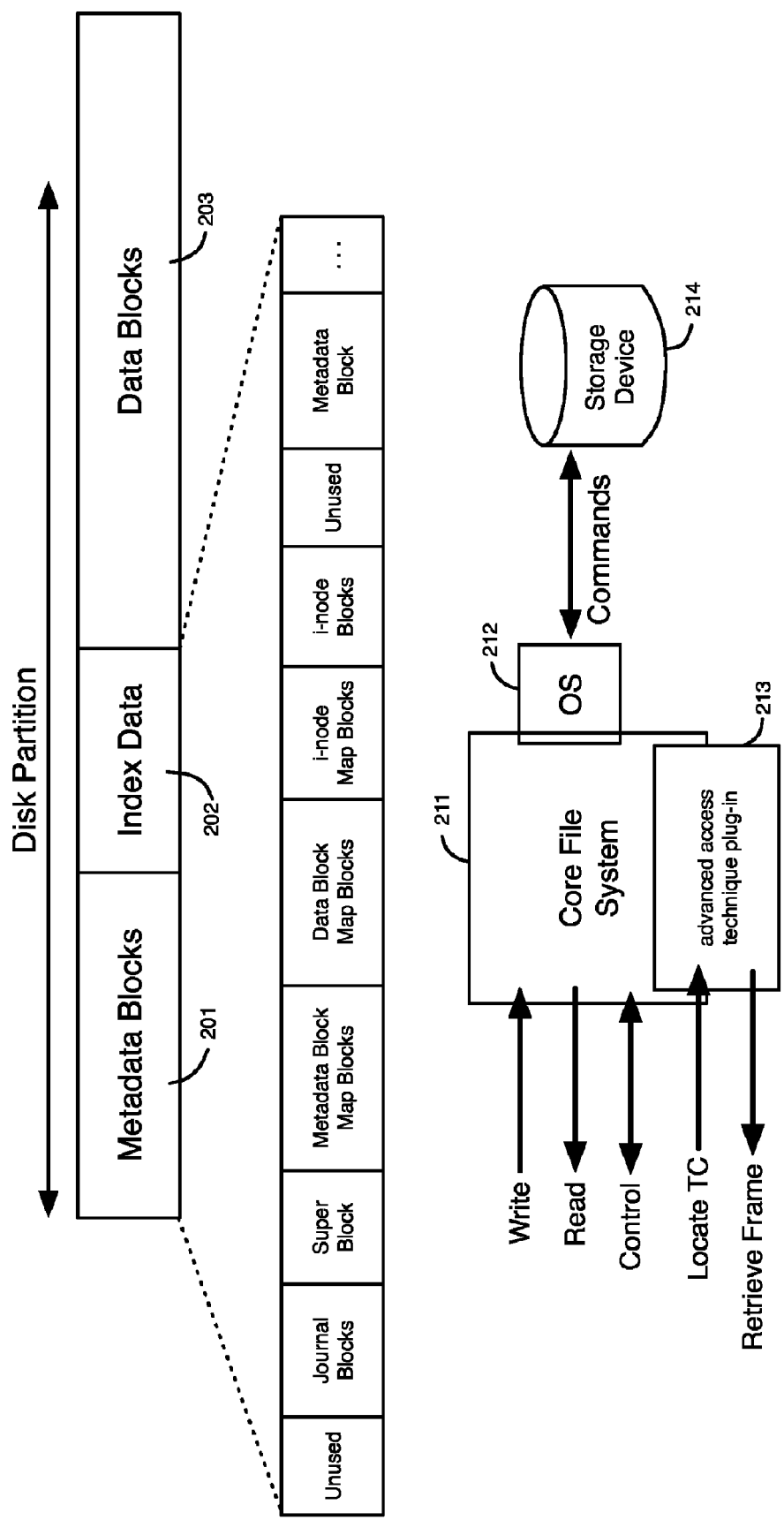
FIG. 2A is a block diagram that illustrates a partition on a hard disk drive containing a file system with an expanded metadata area for storing file index information, and an expanded file system interface with a rich set of system calls that utilize the file index information, according to an embodiment of the present invention.

The hard drive partition shown in FIG. 2A illustrates a file system with extended metadata area for storing file index data, according to a further embodiment of the present invention. Metadata blocks 201 are used to maintain the physical location of data blocks 203 on the storage device. In general, an operating system 212 (OS) uses a static set of commands to access a core file system 211 on a data storage device 214, such as a hard drive.

The metadata area of the file system is extended to include space so that the file system can store the additional index data 202. Thus, index data 202 is an extension of the metadata area 201. Index data 202 includes data that is commonly used to access audio and video streams, such as frame numbers, time code indices, and sample times. Audio and video streams are also referred to herein as multimedia streams.

Embodiments of the present invention provide enhancements to existing file systems and new file systems using a plug-in architecture 213 that may enable advanced data access techniques. The advanced data access techniques can use the stored index data 202 to decrease the time it takes for an application or a user to seek to a location in a multimedia stream. The file system can, for example, use time codes (TC) indices, sample times, and frame numbers stored in area 202 to decrease the access time for media files accessed in multimedia streams. These techniques may also include access to encrypted or otherwise restricted data in the file system.

Processing threads can be added to the file system so that the file system can perform the computation and creation of the index data 202 in the spare processing cycles of the system overall. These processing threads may also process conditional access data stored in the metadata of the file system.

The normal file system interface, which is typically restricted to accessing a file only by byte or block location, is extended to include an interface that allows a media file to be accessed using the index data 202. The file system interface is extended to include a richer group of system calls, such as expanded application programming interface (API) calls to developers. The index data 202 can include seek information to media files, such as frame number, time code index, or audio sample time. The seek information of media files is contained in the file system metadata area.

The index data 202 is either provided by the application, generated automatically by the file system as the data is written, or generated automatically by the file system by using the spare processing cycles of the system. Index data 202 can be generated by a file system when data is transmitted to a storage device to be written on a storage medium. Index data 202 can also be generated in the background by a file system using the spare processing cycles of the system. Index data 202 can also be generated by applications.

Figure 2B:
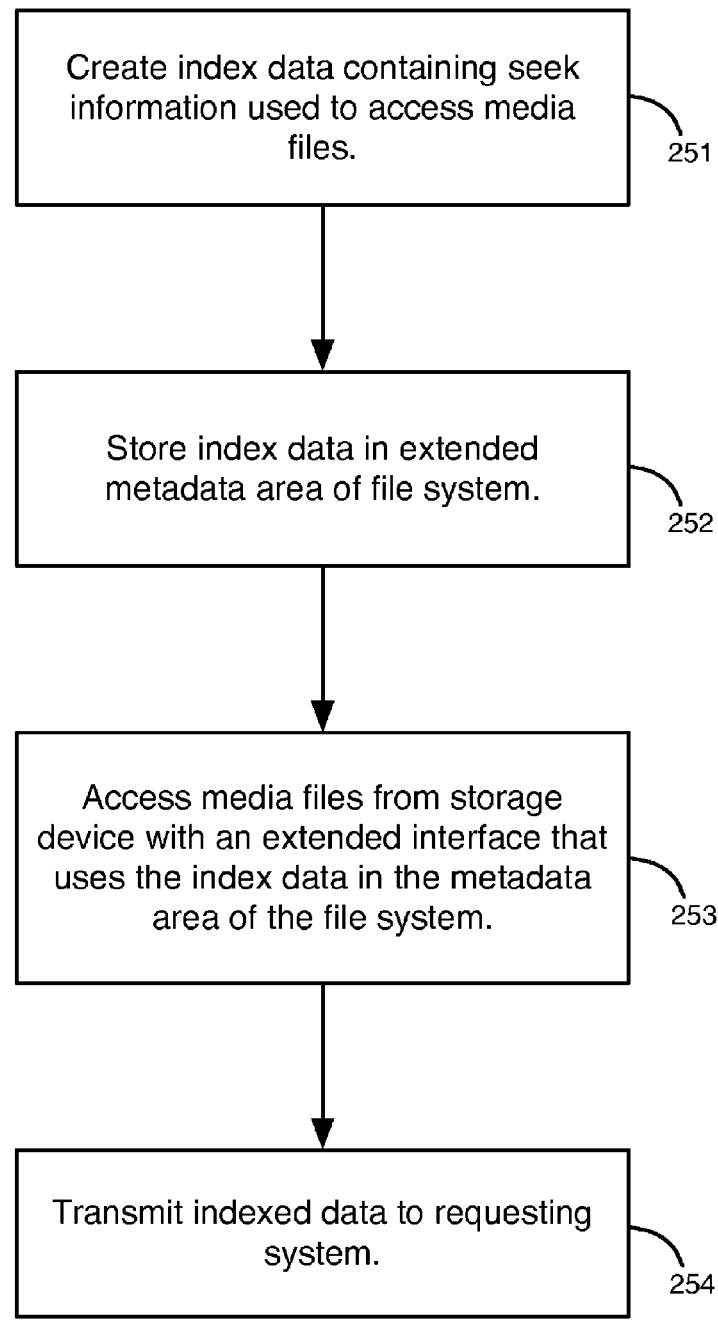
FIG. 2B is a flow chart that illustrates a process for generating and using file index data, according to an embodiment of the present invention.

The flow chart shown in FIG. 2B describes a process that can be performed to increase the accessibility of stored multimedia streams, according to an embodiment of the present invention. Beginning at step 251, index data is created that contains seek information used to access media files. At step 252, the generated index data is stored in an extended metadata area of the file system.

At step 253, a user or an application can request stored media files with an extended interface. The extended interface provides a richer set of commands for accessing the stored media files using the index data 202 in the metadata area of the file system. The extended interface can be provided as an enhancement to existing file systems. Alternatively, the extended interface can be implemented as a plug-in for file systems having a framework that allows advanced access techniques, according to another embodiment of the present invention. At step 254, a file system returns the indexed media data to the requesting system (e.g., a user or application).

According to further embodiments of the invention, the file system may store other data in the extended metadata area of the file system to be used to access protected or encrypted files or data blocks in the system. For example, such data could include conditional access information in a multimedia system.

Figure 3A:
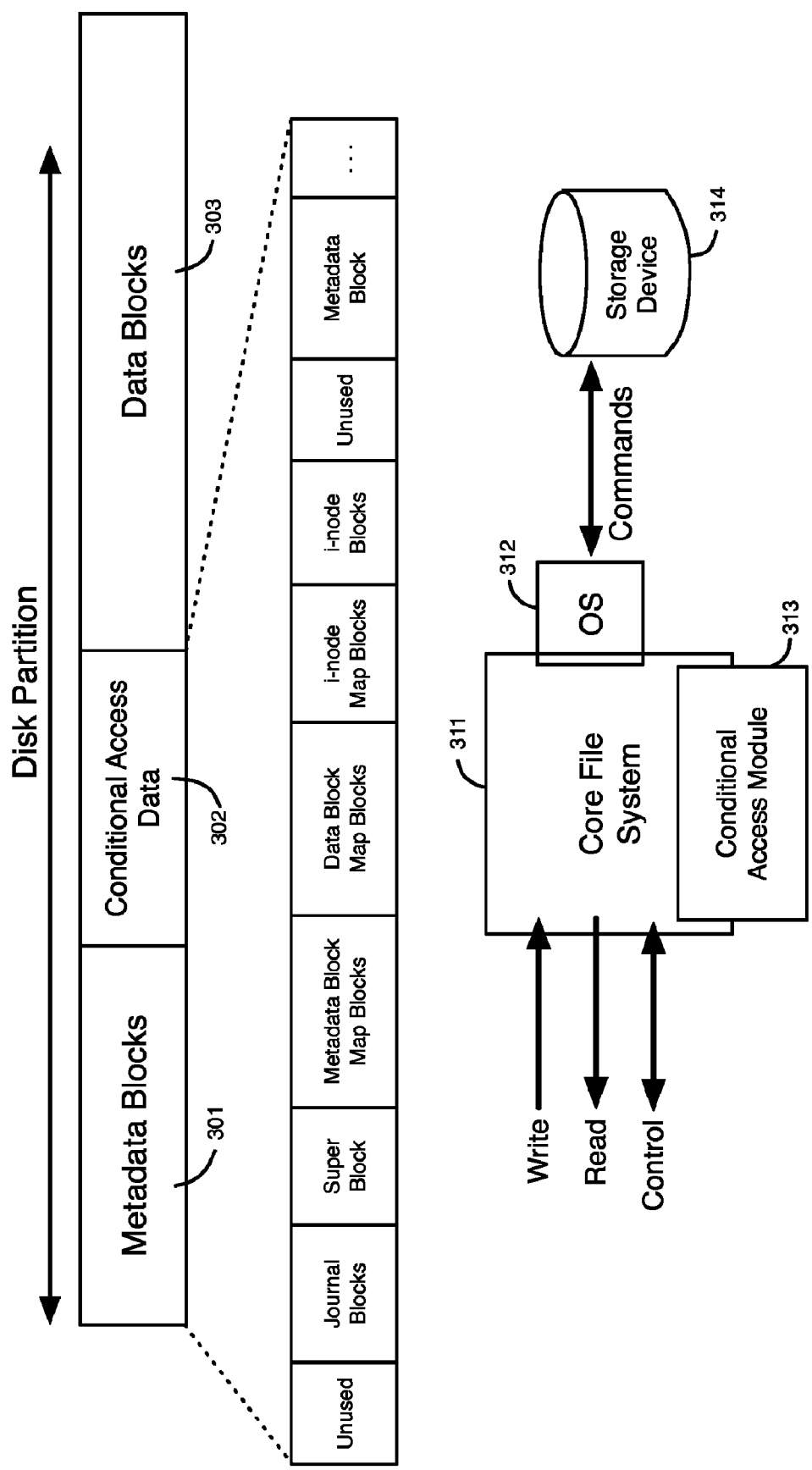
FIG. 3A is a block diagram illustrating a partition on a hard disk drive that contains blocks of conditional access data in an extended metadata area of the file system and a conditional access plug-in module for a core file system, according to another embodiment of the present invention.

FIG. 3A is a block diagram that illustrates a partition on a hard disk drive that contains conditional access data blocks 302 that are integrated at the file system level, according to another embodiment of the present invention. The conditional access data blocks 302 are embedded in an extended metadata area of the file system, as shown in FIG. 3A. The partition also includes metadata blocks 301 and data blocks 303.

Conditional access data blocks 302 can include data and code that allows a system to conditionally access certain content within a data stream. The conditional access data 302 can be used to access data files in any type of data stream, e.g., media files from an audio stream, a video stream, or a multimedia stream.

For example, conditional access data blocks 302 can include keys (e.g., decryption keys) that unlock portions of a multimedia stream that are intended for a particular user. As another example, conditional access data blocks 302 can include data that is used to determine which keys unlock a portion of a multimedia stream. As yet another example, conditional access data blocks 302 can include executable code that is used to access content in a multimedia stream, such as decryption algorithms used to unlock particular sections of a data stream. The conditional access data 302 can be stored in any desired location.

Core file system 311 is managed by a host operating system (OS) 312. Host OS 312 sends commands to a data storage device 314 (e.g., a hard drive) for storing data on and accessing data from device 314. According to an embodiment of the present invention, core file system 311 is configured to dynamically load and run a conditional access module 313. Conditional access module 313 extends the functionality of core file system 311. Specifically, when conditional access module 313 is plugged into core file system 311, it allows core file system 311 to use conditional access data 302 to conditionally access portions of a data stream. For example, module 313 can allow core file system 311 to decrypt portions of a data stream that are intended for an end user using conditional access data 302.

By providing the conditional access functionality at the file system level, this embodiment of the present invention frees higher level application software from performing the conditional access functions. A conditional access system of the present invention can be plugged into any system that has a core file system configured to load and run modules that add functions to the file system, such as module 313. A file system having dynamic functionality is described below with respect to FIGS. 5A-5B.

Figure 3B:
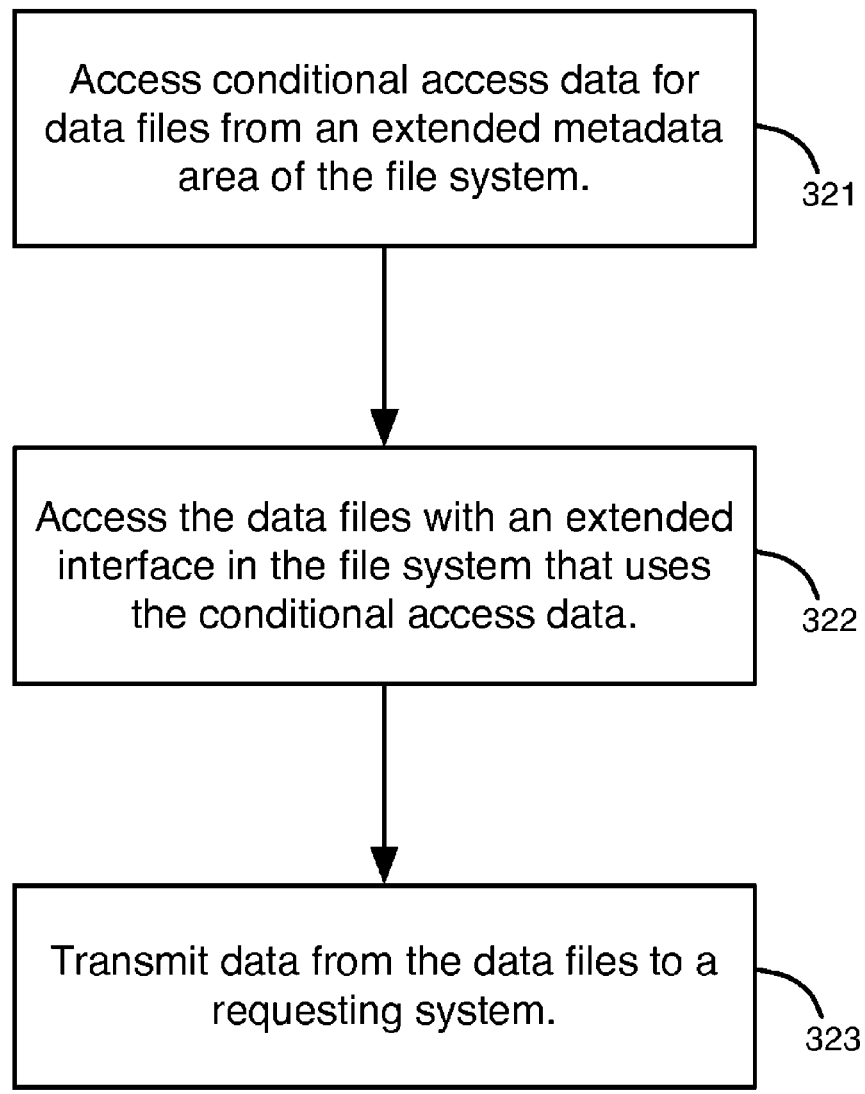
FIG. 3B is a flow chart that illustrates a process for accessing data at the file system level using conditional access data, according to another embodiment of the present invention.

FIG. 3B is a flow chart that illustrates a process for accessing data at the file system level using conditional access data, according to an embodiment of the present invention. At step 321, a file system with enhanced data access functionality accesses conditional access data for data files from an extended metadata area of the file system. At step 322, the file system accesses the data files with an extended interface that uses the conditional access data. At step 323, the data from the conditionally accessed data files is transmitted to a requesting system.

Figure 4:
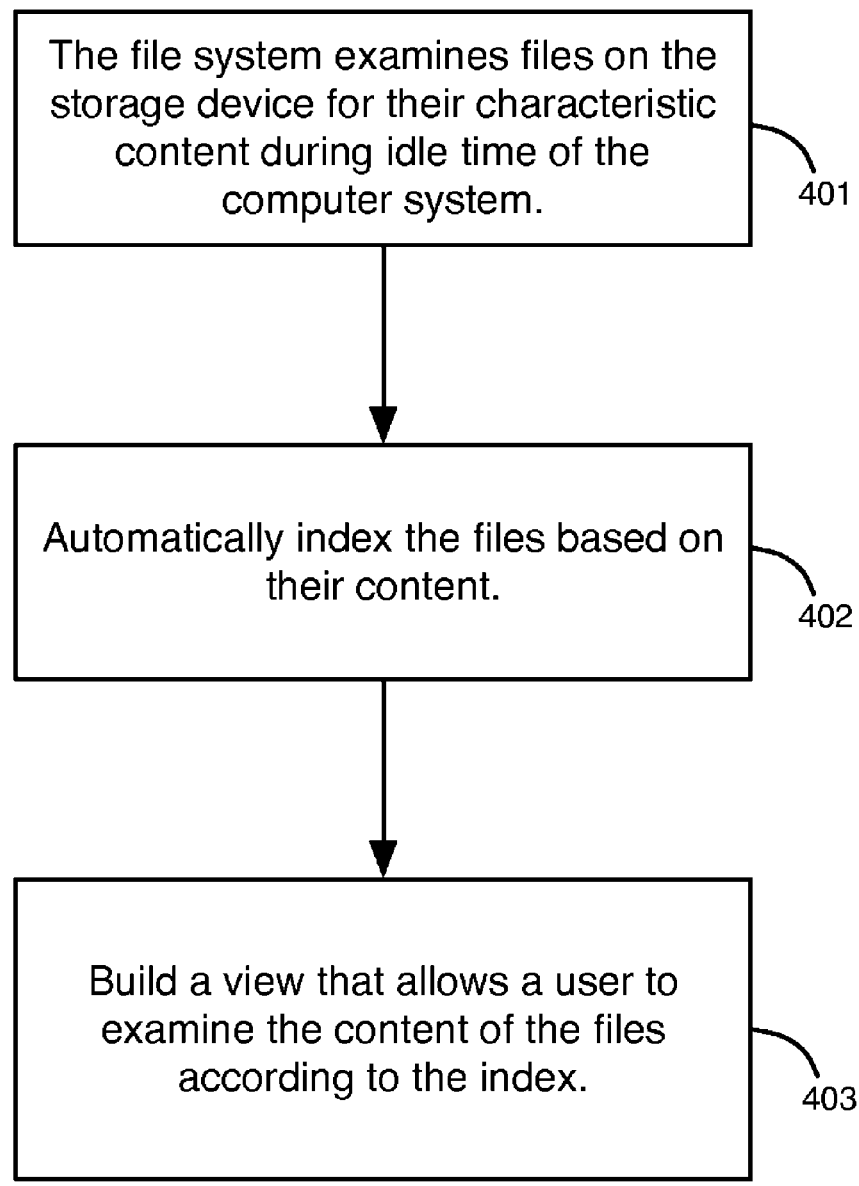
FIG. 4 is a flow chart that illustrates a process for automatic file indexing based on file content, according to an embodiment of the present invention.

The flow chart shown in FIG. 4 describes a process that can be performed by an enhanced file system to automatically categorize data based on audio and visual content, temporal relationships, and other data, according to another embodiment of the present invention. For example, advances in image and sound processing techniques can automatically classify a picture containing sand as belonging to a "Beach" index, and sound files containing certain musical or tonal characteristics as belonging to a "Dance" index.

Beginning at step 401, the file system examines files on a storage device for characteristic content during idle time of the computer system using image processing, temporal relationships, and other data. At step 402, the file system automatically indexes (i.e., categorizes) the files based on their content. User selectable preferences can determine how the file system categorizes the files. Index metadata is generated at step 402 to categorize the files. This index metadata can be stored in the metadata area of the file system on a storage device or in other non-volatile memory.

At step 403, the file system automatically generates a view of the content that permits a user to examine the files according to the index metadata generated at step 402. The view of the content generated in step 403 can be presented in any format, for example, in a file folder view, a hierarchically organized view, a list view, or a tree view.

In general, a file system provides only a static set of read, write, and control commands for dealing with stored data. To add functionality to a file system, one must have access to the source code module for that file system, re-compile that module, then re-format a hard drive partition in order to realize the desired changes. Therefore, it would be desirable to have a file system that offers a core set of functionality, but that also allows for dynamic changes to the functionality and features of the file system, without a loss of existing data.

Figure 5A:
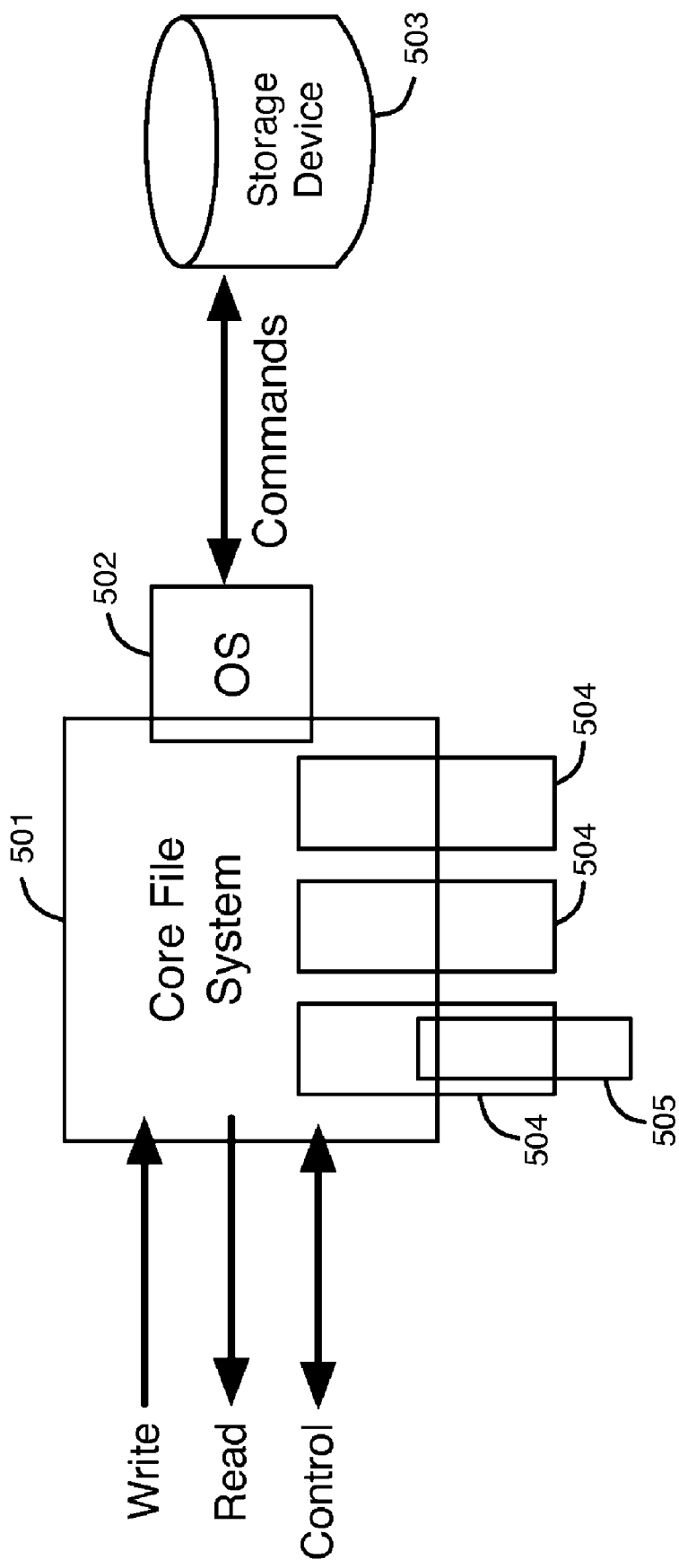
FIG. 5A is a block diagram that illustrates a file system with static and dynamic functionality, according to an embodiment of the present invention.

According to yet another embodiment of the present invention, a core file system 501 implements a framework that allows for the use of advanced access modules 504, as shown in FIG. 5A. Advanced access modules 504 can dynamically add functions to a file system, without a modification to the core functionality of the file system or a loss of existing data.

FIG. 5A illustrates a host OS 502 that uses a core file system 501 to access a data storage device 503 (such as a hard disk drive). Core file system 501 can generate a static set of write, read, and control commands for dealing with file system data. Advanced access modules 504 are plug-ins to file system 501 that can be loaded at run-time to provide additional functions to the file system. Modules 504 can examine the metadata area of the file system to decide if additional plug-ins 505 should also be loaded into file system 501.

Figure 5B:
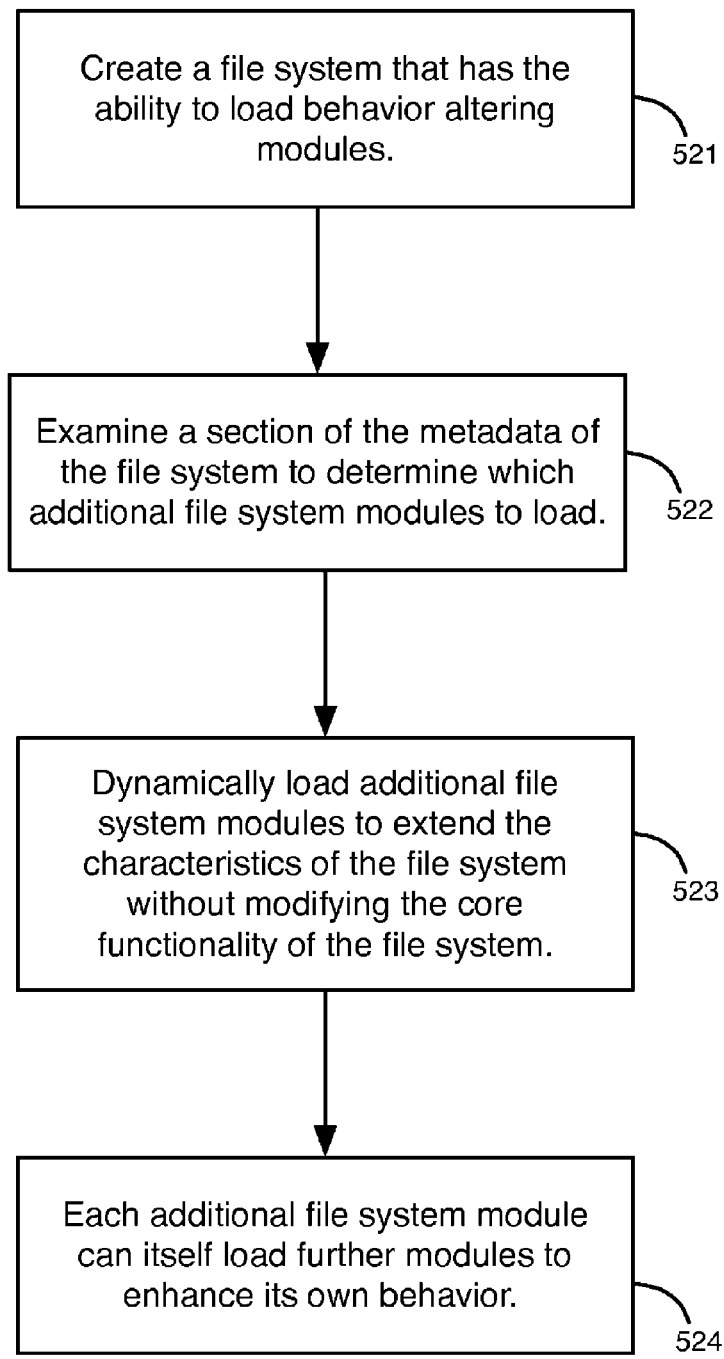
FIG. 5B is a flow chart that illustrates a process in which a file system can load modules that further enhance the functionality of the file system, according to an embodiment of the present invention.

The flow chart depicted in FIG. 5B illustrates a process that can be performed by a file system to provide dynamic functionality to the file system. Beginning at step 521, a file system is created that provides core functionality as well as a framework for dynamically adding new functionality. The file system has the ability to load modules that add new functions to the file system. At step 522, one or more of the core operating system modules that contain the basic file system functionality examine a section of the metadata area of the file system to decide if additional modules 504 are to be loaded. If additional modules are to be loaded, the core operating system modules identify the additional modules 504 that are to be loaded.

At step 523, modules 504 are dynamically loaded. Modules 504 extend the functionality of the file system, without effecting the core functionality of the file system or the stored data. At step 524, the loaded modules 504 decide if further modules 505 are also to be loaded. Each of the loaded modules 504 can load one or more additional modules 505 to enhance the behavior of the loaded module 504. The additional modules 505 can load further modules, if desired. The present invention is not limited to the number of modules that can be loaded or chained to provide enhancements to a file system.

The foregoing embodiments of the present invention do not require any changes to a hard drive's block interface, and as a result a hard drive of the present invention can be a drop-in replacement in existing systems.

The foregoing description of the exemplary embodiments of the present invention has been presented for the purposes of illustration and description. It is not intended to be exhaustive or to limit the present invention to the precise form disclosed. A latitude of modification, various changes, and substitutions are intended in the present invention. In some instances, features of the present invention can be employed without a corresponding use of other features as set forth. Many modifications and variations are possible in light of the above teachings, without departing from the scope of the present invention. It is intended that the scope of the present invention be limited not with this detailed description, but rather by the claims appended hereto.

The invention claimed is:

1. A system for storing data, the system comprising:
a data storage device that reads data from a data storage medium and that performs a first level of error correction on the data, wherein the data storage device provides recovered data if the data storage device fails to correct errors in the data using the first level of error correction; and
a file system that receives the recovered data from the data storage device and that performs a second level of error correction on the recovered data to correct errors in the recovered data independently of the data storage device.

2. The system for storing data defined in claim 1 wherein the file system generates blocks of error correction code (ECC) and assigns some number of ECC blocks to each block of the data.

3. The system for storing data defined in claim 1 wherein the file system generates blocks of error correction code (ECC) and assigns one of the ECC blocks to each block in the file system.

4. The system for storing data defined in claim 1 wherein the file system generates blocks of error correction code (ECC) and assigns the ECC blocks to blocks of metadata that describes the data.

5. The system for storing data defined in claim 1 wherein the file system generates blocks of error correction code (ECC) and stores the ECC blocks in a metadata area of the file system.

6. The system for storing data defined in claim 1 wherein the file system generates blocks of error correction code (ECC) and stores the ECC blocks in Flash memory.

7. A computer system that comprises a computer readable medium storing code for accessing data from a data storage device, the computer system comprising:
code for creating index data that contains seek information used to access media files;
code for storing the index data in an extended metadata area of a file system, wherein the code for creating the index data that contains the seek information used to access the media files further comprises code for creating the index data by the file system during spare processing cycles of a computer system;
code for accessing the media files from the data storage device with an extended interface that uses the index data in the metadata area of the file system; and
code for transmitting data from the media files to a requesting system.

8. The computer system defined in claim 7 wherein the index data comprises at least one of frame numbers, time code indices, and sample times.

9. The computer system defined in claim 7 wherein the file system has a framework that allows advanced access plug-ins, and the extended interface is implemented as a plug-in for the file system.

10. A method for categorizing files based on content of the files using a file system, the method comprising:
examining files stored on a storage device using the file system to determine the content of the files during idle time of a computer system;
automatically categorizing the files based on the content of the files to create index metadata using the file system; and building a view that allows a user to examine the content of the files using the index metadata.

11. The method defined in claim 10 wherein automatically categorizing the files based on the content of the files to create the index metadata using the file system further comprises automatically categorizing the files based on audio content of the files using sound processing of the files.

12. The method defined in claim 10 wherein automatically categorizing the files based on the content of the files to create the index metadata using the file system further comprises automatically categorizing the files based on visual content of the files using image processing of the files.

13. A computer system that comprises a computer readable medium storing code for accessing data, the computer system comprising:
    code for accessing conditional access data for data files from an extended metadata area of a file system;
    code for accessing the data files with an extended interface in the file system that uses the conditional access data to access the data files; and
    code for transmitting data from the data files to a requesting system.

14. The computer system defined in claim 13 wherein the code for accessing the data files further comprising code for using the conditional access data to access media files from a multimedia stream.

15. The computer system defined in claim 13 wherein the code for accessing the data files further comprises code for using the conditional access data to access the data files from a hard disk drive.

16. A computer system that comprises a computer readable medium storing code for enhancing functionality of a file system, the computer system comprising:
    code for running a file system configured to a load at least one file system module that adds a function to the file system;
    code for examining metadata of the file system to identify a first file system module that adds a first function to the file system; and
    code for dynamically loading the first file system module to add the first function to the file system without modifying core functions of the file system.

17. The computer system defined in claim 16 further comprising:
    code for loading a second file system module into the first file system module to add a second function to the file system.

18. The computer system defined in claim 16 wherein the code for dynamically loading the first file system module to add the first function to the file system without modifying the core functions of the file system further comprises code for dynamically loading a second file system module to add a second function to the file system without modifying the core functions of the file system.

19. The computer system defined in claim 16 wherein the code for dynamically loading the first file system module to add the first function to the file system without modifying core functions of the file system further comprises code for loading a conditional data access module to allow the file system to access data using conditional access data.

* * * * *